United States Patent
Welch et al.

(10) Patent No.: US 6,892,586 B1
(45) Date of Patent: May 17, 2005

(54) MEASURING AND CONTROLLING THE FLOW OF FLOWABLE MATERIALS

(75) Inventors: Barry John Welch, Orakei (NZ); Evan William Andrews, South Launceston (AU)

(73) Assignees: Comalco Aluminum Limited, Brisbane (AU); Auckland Uniservices Limited, Auckland (NZ)

( * ) Notice: Subject to any disclaimer, the term of this patent is extended or adjusted under 35 U.S.C. 154(b) by 0 days.

(21) Appl. No.: 09/937,351
(22) PCT Filed: Mar. 24, 2000
(86) PCT No.: PCT/AU00/00254
§ 371 (c)(1),
(2), (4) Date: Nov. 30, 2001
(87) PCT Pub. No.: WO00/57139
PCT Pub. Date: Sep. 28, 2000

(30) Foreign Application Priority Data

Mar. 24, 1999 (AU) .............................................. 2134799

(51) Int. Cl.⁷ ................................................. G01F 1/37
(52) U.S. Cl. .................................. 73/861.52; 73/861.53
(58) Field of Search ......................... 73/861.52, 861.53, 73/861.61, 861.63

(56) References Cited

U.S. PATENT DOCUMENTS 5,476,574 A    12/1995  Welch et al.
5,576,499 A    11/1996  Davies
5,798,466 A  *  8/1998  Satake et al. ............ 73/861.73

FOREIGN PATENT DOCUMENTS

| | | |
|---|---|---|
| DE | 36 17 595 A | 11/1987 |
| DE | 39 23 653 | 1/1991 |
| EP | 0 834 723 A | 4/1998 |
| GB | 2 241 789 A | 9/1991 |
| NZ | 234570 | 7/1990 |
| WO | WO 94/05980 | 3/1994 |

* cited by examiner

*Primary Examiner*—Edward Lefkowitz
*Assistant Examiner*—Corey D. Mack
(74) *Attorney, Agent, or Firm*—Merchant & Gould P.C.

(57) ABSTRACT

A method of determining an inlet flow rate ($F_{inlet}$) of a flowable material including passing an inlet stream of flowable material through a chamber (20) having an outlet aperture (100); measuring a first rate of change of quantity of material in the chamber (20) when the material is entering at said inlet flow rate; measuring a second rate of change of quantity if material in the chamber (20) when no material is entering the chamber (20); and calculating the inlet flow rate ($F_{inlet}$) from said first and second rates, wherein both rate measurements are made while the whole of the outlet aperture (100) of the chamber (100) of the chamber (20) is occupied by the flowable material.

28 Claims, 15 Drawing Sheets

MEASURING AND CONTROLLING THE FLOW OF FLOWABLE MATERIALS

BACKGROUND

1. Field of the Invention

The present invention relates to methods and apparatus for monitoring and controlling the flow of flowable materials such as sand, gravel, or liquids. In particular the present invention relates to a method for monitoring and calibrating continuous, semi-continuous or intermittent feeding systems for discharging granular or powdered free flowing materials at known mass feed rates.

2. Related Art

As used herein, a flowable material is a material that can flow under the influence of gravity, including liquids such as water or syrup, and solids; substantially dry particulate materials such as sand, gravel, or alumina.

The aluminium industry has served as a stimulus for this work. The aluminium industry has matured in the period since the electrolytic reduction process was developed by Hall and Héroult in 1888. The method by which the alumina is fed to the melting cells is one particular area in which the industry has changed significantly. Changes in alumina feeding technology have been accelerated since 1960 when the size of cells increased above 100,000 amperes and environmental requirements associated with the growth of the industry meant that the cells have to be enclosed as much as possible. Mechanical automated systems have given way to point feeders where small amounts (in the range 0.5 to 3 kg typically) of alumina are added through the crust of the cell utilising a hole that has been pierced by a crust-breaker. This has moved smelting from a semi-batch operation to a more continuous one.

Recent trends in the smelting industry for improving the energy efficiency and performance of the cells have resulted in the electrolyte being modified to compositions that result in lower solubility ranges for the added aluminium oxide. Therefore, even with the smaller additions possible with point feeders, the process has a tendency to periodically or continuously form an aggregate or slurry of undissolved alumina and electrolyte that sinks to an inaccessible region below the liquid metal. This causes operating disturbances. A deficiency develops in the amount of alumina available, based on the assumed feed versus the actual additions. The energy efficiency also deteriorates because of the extra resistance generated by the material lying under the liquid metal cathode.

Studies of alumina dissolution have established that sludge formation is minimised when the alumina is added as slowly as possible thus suggesting continuous input will enable better cell performance. Accordingly, U.S. Pat. No. 5,476,574 assigned to Comalco Aluminium Ltd discloses a continuous feeder for adding alumina to the electrolytic cell. The apparatus is based on controlling the cross-sectional area of an orifice through which the powder flows by means of a connected pneumatic linear positioner. The main disadvantage of this feeder is that it is insensitive to changes in the flow and physical properties of the alumina. There is no feedback information provided from the system that can either identify or self-correct changes such as in the properties of the alumina which alter the mass flow rate relationship and therefore reduce the potential benefits of continuous feeding.

All previous feeding systems have been based on volumetric measurements and these have limited accuracies because densities of particular materials can typically vary by 10%. While application of volumetric measurements to the continuous feeding of alumina has resulted in the potential for significant improvements in feeding accuracy, the feedback information is slow and thus the corrections not optimal. In particular its lack of sensitivity to blockages from out-of-range particulate material makes it desirable to incorporate a mass flow measurement system.

New Zealand patent 234570 assigned to DSIR Industrial Development describes a slot flow meter for measuring mass flow rates of solids. This device consists of a chamber with a closed base and one or more substantially vertical slots in its sides. Particulate solids are passed through the chamber in such a way that only part of the overall slot length is occupied by the flowable material (hence the term "open slot"). In this "open slot" arrangement, particulate solids or more generally flowable material introduced into the chamber will tend to flow out through the slots at a rate proportional to the height of solids in the slots. The mass feed rate indicated by a given height is dependent on particulate properties including bulk density. It is usually impractical to measure the height of flowing solids at the slots and therefore a mass sensing device is used to determine the mass of solids in the chamber. Theoretical relationships between the mass of solids in the chamber and the solid mass flow rate have been described, particularly in the transient filling and emptying modes.

One significant disadvantage of using this "open slot" method in some environments is that a very complex mass determination means is required to determine the mass of material in the flow meter. In particular, in the application of the method to the process of electrolytic reduction, the components of the mass measurement means must be able to withstand high temperatures, electromagnetic interference and radio frequency disturbances.

According to NZ 234570 and other publications on the slot flow meter, there is an approximately straight line relationship between mass of material in the chamber of the slot flow meter, and the height of material in the chamber. However, this relationship is only approximate, and outside factors can result in significant discrepancies between the flow rate calculated by the slot flow meter and the actual flow rate. For example, at low flow rates, using currently known slot flow meters, the relationship is not directly proportional, and therefore there is some discrepancy between the flow rate calculated by the slot flow method and the actual flow rate.

Accordingly, it is desirable to have a second, reliable source of information to calibrate the slot flow meter, or alternatively, a different technique altogether which is not subject to the inaccuracies of the slot flow meter described above.

It is not a simple matter in environments such as the environment in which the alumina reduction process is carried out to set up a second system for accurately recording the flow of material. There is often a very limited space between the storage vessel and the melting cell in which to place the equipment. In addition, any equipment installed must be able to withstand high temperatures, electromagnetic interference and radio frequency disturbances.

If a different technique is desired altogether this system would also need to include components which are able to withstand the above conditions. Optical strain gauge transducers can be used to measure the mass of material in the slot meter system under these conditions, however they are complex and expensive, costing the region of $7,000 to $10,000. An alternative mass measurement means costing less money would be desirable in a new system.

The known slot flow meter system requires no prior knowledge of the material being dispensed. However, if the flow properties of the material change significantly, then the expression between mass and solid mass flow rate may also change. Such changes are known to frequently occur in alumina through segregation, particle size distribution variations, and other parameters. This results in calibration limitations in the system which limit accuracy at low flow rates. Accordingly an object of the present invention is to provide a method for calibrating the flow meter, or a different method for determining mass flow rate.

It is an object of this invention to provide an improved method and apparatus for measuring and controlling the discharge of flowable material, or at least to provide the public with a useful choice.

According to the present invention there is provided a method of determining an inlet flow rate ($F_{inlet}$) of a flowable material including:

(a) passing an inlet stream of flowable material through a chamber having an outlet aperture to one end thereof;

(b) measuring a first rate of change of quantity of material in the chamber when the material is entering at said inlet flow rate;

(c) measuring a second rate of change of quantity of material in the chamber when no material is entering the chamber; and (d) calculating the inlet flow rate $F_{inlet}$ from said first and second rates;

wherein steps (c) and (d) are conducted whilst the whole of the outlet aperture in the chamber is occupied by the flowable material.

In contrast to the "open slot" arrangement, a "closed aperture" or "closed slot" flow pattern is produced when the whole of the aperture or slot is occupied by the flow of material. In other words, the level of flowable material in the chamber must be above the uppermost point of the or each outlet (drain) aperture in the chamber when conducting steps (b) and (c). A closed aperture or closed slot flow rate is approximately constant so that the rate at which solids flow or drain out of an opening can be estimated from the slope of the mass-time drainage curve.

It has been found by the applicant of the present invention that a relatively simple "two-point mass measurement" technique can be used to measure an inlet flow rate of flowable material, and that this simple technique can be utilised in a calibration system in order to provide a simple method for calibrating a continuous feeding system. In a preferred embodiment of the invention the method of determining an inlet flow rate of flowable material utilises simple and inexpensive components, which can withstand the high temperatures, electromagnetic interference and radio frequency disturbances to which the components will be exposed in preferred applications of this technique, such as in the process of electrolytic reduction of alumina.

In contrast to known slot-flow meters, this preferred flow meter of the present invention includes:

a chamber through which the flowable material can pass, the chamber including an outlet aperture at a lower end thereof and a wall defining an enclosed region above said outlet aperture, wherein the dimensions of the wall are such that flow rates can be measured whilst the whole of the outlet aperture in the chamber is occupied by flowable material.

The slot flow meter of the present invention may be either a modified version of the slot flow meter of NZ 234570, or may be a flow meter having no vertical elongate slot feature.

In contrast to known slot flow meters, both types of flow meter of the present invention include a wall defining an enclosed region above the outlet aperture having dimensions which are great enough to enable the flow rate to measured whilst the whole of the outlet aperture in the chamber is occupied by flowable material (ie. a "closed region" or a "closed aperture" region). Such flow meters can therefore be operated in such a way that the flowable material passing into the meter will flow under "closed slot" meter principals.

It is to be noted that the "closed aperture" flow meter of the present invention may include an open slot region for operating the meter using known open-slot principles. However, it has hitherto been unknown to provide such meters with a "closed aperture" or "closed slot" region and to calibrate the meter by reference to a closed aperture calibration sequence. Specifically, the closed slot meter theory can be utilised to calibrate the flow meter, and thereafter the actual flow rate measured by the open slot flow rate determination method can be compared to the flow rate expected at the given flow setting.

According to an alternative embodiment of the invention, the flow meter does not have an "open slot" feature. With reference to this particularly preferred embodiment of the invention, it has been found by the applicant that by combining this closed slot flow meter with simple measurement means it is possible to obtain a flow meter for calculating the solids mass flow rate of a flowable material (on an intermittent basis) which is relatively very inexpensive to install and is relatively robust in the harsh operating conditions that may be experienced in the electrolytic reduction process. Therefore a number of disadvantages associated with open slot meters can be avoided.

One principal disadvantage in the application of the known slot-flow meter to aluminium smelting applications which is avoided concerns the need in such applications to measure a wide range of feed rates. For instance, for a 170 kA cell having 4 feeders (each provided with a flow meter) under normal operating conditions each feeder supplies alumina at a rate of 5–9 g/s. However, in the event of an anode effect (where it is necessary to feed alumina into the cell as quickly as possible) the flow rate required is 35 g/s or more. The complete range of 0–40 g/s is difficult to measure accurately at both low and high flow rates in the known slot flow meter. As explained above, at low flow rates the slot flow meter is not extremely accurate.

The flow meter developed by the present application also has the advantage over the known slot-flow meter in that the outlet aperture can be sized to permit passage of oversized material. In contrast, known slot flow meters require a relatively narrow slot region.

In addition, since the flow meter of the present invention does not require a relatively long open slot region, the height of the unit can be reduced. The height of the components used in a flow meter in some environments can be critical in determining whether the flow meter is suitable for a particular application. Accordingly this is a significant advantage of the flow meter of one preferred embodiment of the invention over known slot flow meters.

For instance, in the case of the aluminium smelting industry, a number of flow meters are used at a number of feeding points to feed alumina into one cell. Each feeder (and therefore each flow meter) used must have the capacity to feed larger than average quantities of alumina into the cell in the event that one or more of the other feeders fails.

Hence, for an open slot meter, twice the normal operating level of slot capacity is required. This corresponds to an open slot meter with an increased slot height, if the same mass versus mass flow rate resolution is required. Alternatively, if there is not enough space for the increased chamber height required, and a wider slot is used, resolution is compromised.

The chamber of the flow meter of the present invention may include one or more outlet apertures. In the case of a plurality of outlet apertures, the base of the chamber is shaped so as to facilitate even distribution to each outlet aperture.

Preferably, the chamber of the flow meter also includes outflow openings above the enclosed region of the chamber. The outflow openings enable overflow levels of flowable material to pass through the flow meter.

In the case where the flow meter of the present invention includes an elongate slot, the elongate slot may constitute the outlet aperture, or may be present in addition to the outlet aperture.

In the case where the elongate slot is present in addition to the outlet aperture, the outlet aperture is preferably sized to permit passage of oversized material that cannot exit the chamber of the flow meter through the elongate slot. It is also preferred that the outlet aperture be spaced apart from the elongate slot. Whilst it is not necessary for the outlet aperture and the elongate slot to be vertically aligned, in a preferred embodiment the elongate slot is spaced vertically above the outlet aperture.

According to one preferred embodiment of the invention, the chamber of the flow meter does not include an elongate slot of the type that enables the flow of material through the meter to be calculated using open slot meter calculations. According to this preferred embodiment of the invention, the chamber through which the flowable material can pass has an outlet aperture at a lower end thereof of a cross section that enables flowable material to drain from the chamber at a rate less than the minimum flow rate to be measured.

As will be explained in further detail below, the flow meter having a chamber of this configuration enables a simple two mass point calculation to be utilised to determine the flow rate of flowable material passing through the chamber.

Preferably, the flow meter includes measurement means for measuring the time taken for the mass of flowable material in the meter to pass from a first mass to a second mass. Any known means may be used to detect when the mass has passed from a first mass to a second mass.

This can be detected by recording any measurable quantity that varies proportionally to the mass of material. For example:

actual mass could be measured, the height of material in the flow meter could be measured and converted into a mass measurement, the pressure transducer output voltage in a pressure bellows could be measured and corresponding mass calculated;

the capacitance in a parallel plate capacitor fitted to the outlet slot of the weighing chamber could be measured and a mass calculated therefrom; or the chamber walls could be configured to constitute a parallel plate capacitor and a mass calculated from the capacitance measured therefrom.

Preferably, the measurement means includes a displacement means enabling the chamber to move between a first position at a first mass of flowable materials present in the chamber and a second position when a second mass of material is present in the chamber, and timing means (including, for example, an electrical circuit) by means of which the time taken for the chamber to move between said first and second positions is measured. The displacement means may be of any suitable configurations and may for example include a beam such as a carbon fibre beam or a biasing means such as spring. As explained above, it is preferred that the measurement means detects movement between two discrete positions corresponding to the first and second masses only.

According to the present invention there is provided a method for calibrating the rate at which flowable material is discharged from a storage vessel through a flow control means, said flow control means having a plurality of settings controlling the rate of flow of flowable material discharged from the storage vessel over a flow rate range between minimum and maximum flow rates corresponding to minimum and maximum flow rate settings, the method including:

(a) calculating the flow rate for a first flow rate setting of the flow control means;

(b) calculating the flow rate for a second flow rate setting of the flow control means; and (c) calculating a flow rate versus flow control means setting expression.

Preferably the flow rates for the first and second flow rate settings are determined by the method described in general above.

Preferably the flow control means includes a flow control valve.

The flow control valve may be of any suitable configuration. Without wishing to limit the scope of the invention, according to a preferred embodiment of the invention the flow control valve may comprise a plate having a variable shaped orifice. By changing the position or the setting of the valve relative to an outflow point of the storage vessel, the size of the opening and hence the solids mass flow rate will be caused to change.

Preferably, the method for calibrating the rate at which flowable material is discharged from the storage vessel through the flow control valve involves calculating the flow rate at a flow rate setting which corresponds to the maximum flow rate and the minimum flow rate.

Preferably, these flow rates are determined using the methods described in general above.

According to the present invention there is also provided a method of monitoring a continuous feeding system for flowable materials which flow through a flow control means having a plurality of settings, said method comprising:

(a) calibrating the rate at which flowable material is discharged to the flow control means to obtain a flow rate versus flow control means setting expression;

(b) setting the flow control means at the setting required to obtain a required flow rate as calculated by the flow rate versus flow control means setting expression; and (c) re-calibrating the rate at which flowable material is discharged through the flow control means to obtain a re-calibrated flow rate versus flow control means setting expression.

Preferably the re-calibration step is conducted when a precondition is met. Depending on the particular flow rate determining method in use in the system, the precondition may be one of a number of events. For example, the precondition may be that a pre-set time period has elapsed since the last calibration or re-calibration was conducted. Alternatively, the precondition may be based on a certain flow rate measurement reading taken by a second flow rate determining method (eg. the slot flow meter method). Another alternative is when the measuring signal changes outside pre-determined limits thus signifying a change in property of the material that may influence its mass flow rate.

According to one embodiment of the invention, the precondition is one of the following:

(i) that the flow rate required has changed and the previous flow rate was the maximum flow rate; and (ii) that the flow rate required has changed, the new flow rate required is not the maximum flow rate, the setting of the flow control means is changed to correspond to the new flow rate required, the flow rate at the new flow control means setting is calculated, and the new flow rate calculated is not within a tolerance range of the flow rate expected at the new flow control means setting.

According to an alternative embodiment of the invention, the precondition may be that the discharge flow rate at a given flow control means setting measured by a second flow rate determining method is not within a tolerance range of the flow rate expected at the given flow control means setting.

BRIEF DESCRIPTION OF THE FIGURES

The invention will now be described in further detail by reference to the accompanying drawings in which.

DETAILED DESCRIPTION OF THE INVENTION

By way of illustrative example and without limiting the scope or extent of this invention, the feeding system of this invention is herein applied to the continuous or semi-continuous feeding of alumina to an electrolytic cell for production of aluminium by the Hall Héroult process. The invention results in the desired degree of precision—at least in laboratory trials. The cell itself, having a large capacity, is capable of averaging out fluctuations in instantaneous flow that are caused by the diagnostic procedures carrying out self-checks from time to time.

The invention is an integrated system of continuously, semi-continuously or intermittently feeding powders and/or granular materials or the like in a manner such that the mass feed rate can be computed and re-calibration can occur through a short flow interrupt sequence.

In principle the invention includes three interfaced modules that are controlled by an appropriate logic system.

The first module is a storage vessel or feed hopper with a flow control means at its base. The flow control means (or flow control valve) includes either a mechanical discharge device such as pinch valve, belt, rotary or screw type feeder or an adjustable discharge aperture, which is the preferred mechanism. The adjustable aperture is positioned by an appropriate positioning means which can switch between several different apertures, or alternatively a continuously variable opening. The positioning means may for example consist of a sliding or rotating type actuator. This feed control mechanism also incorporates an off position.

Figure 1:
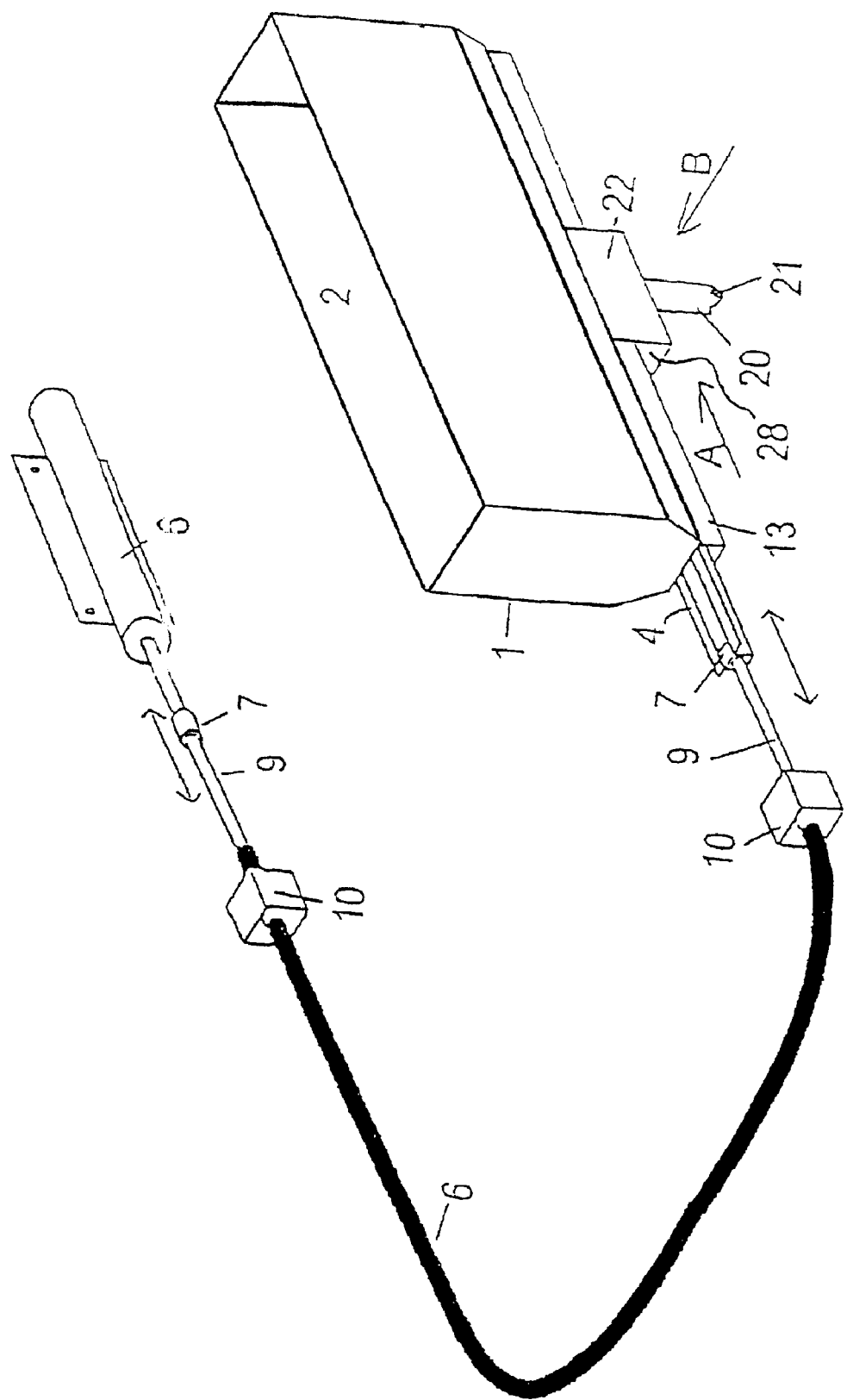
FIG. 1: shows the preferred form of experimental apparatus of the invention.
Figure 2:
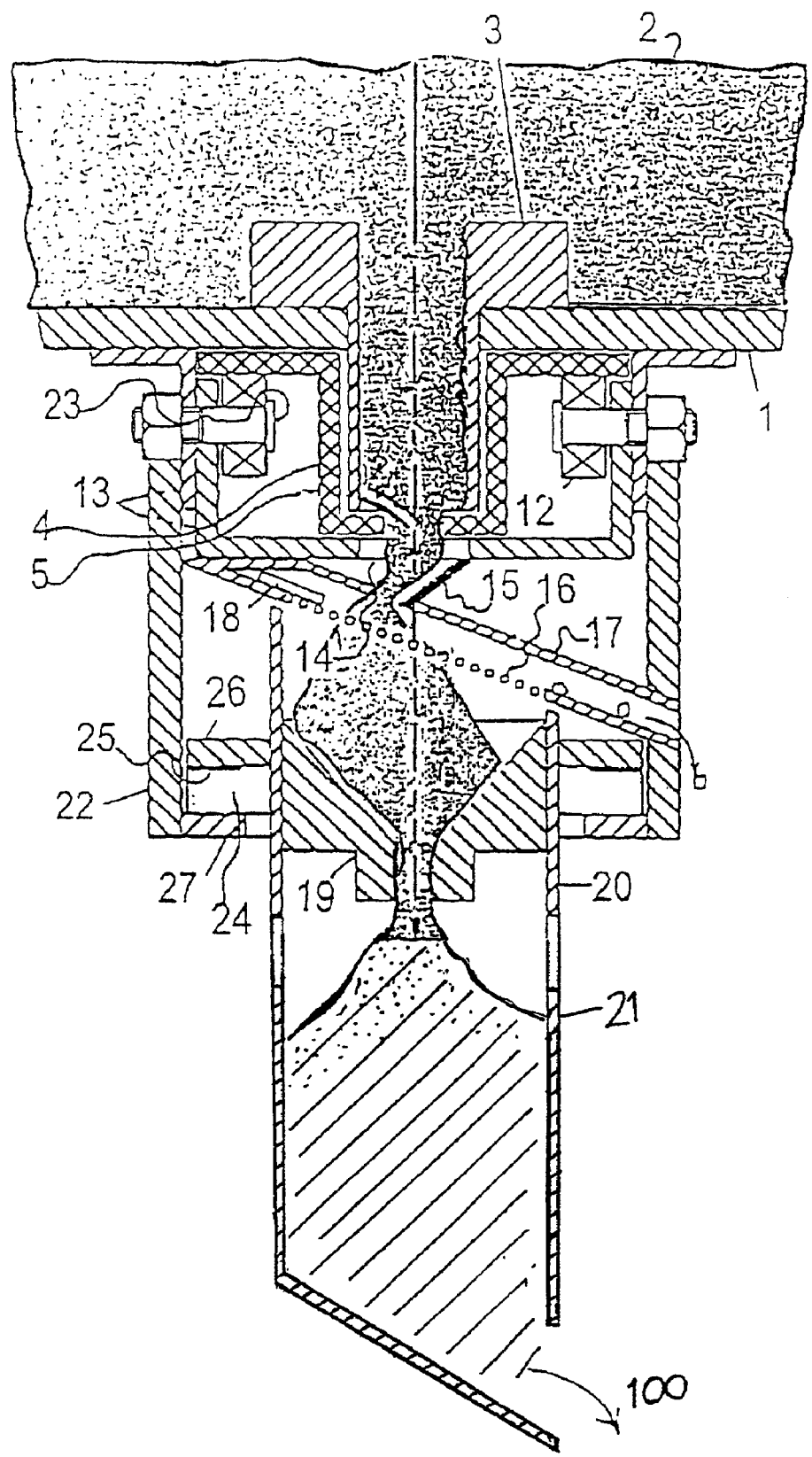
FIG. 2: is a cross-sectional side view of one flow meter of the invention.
Figure 3:
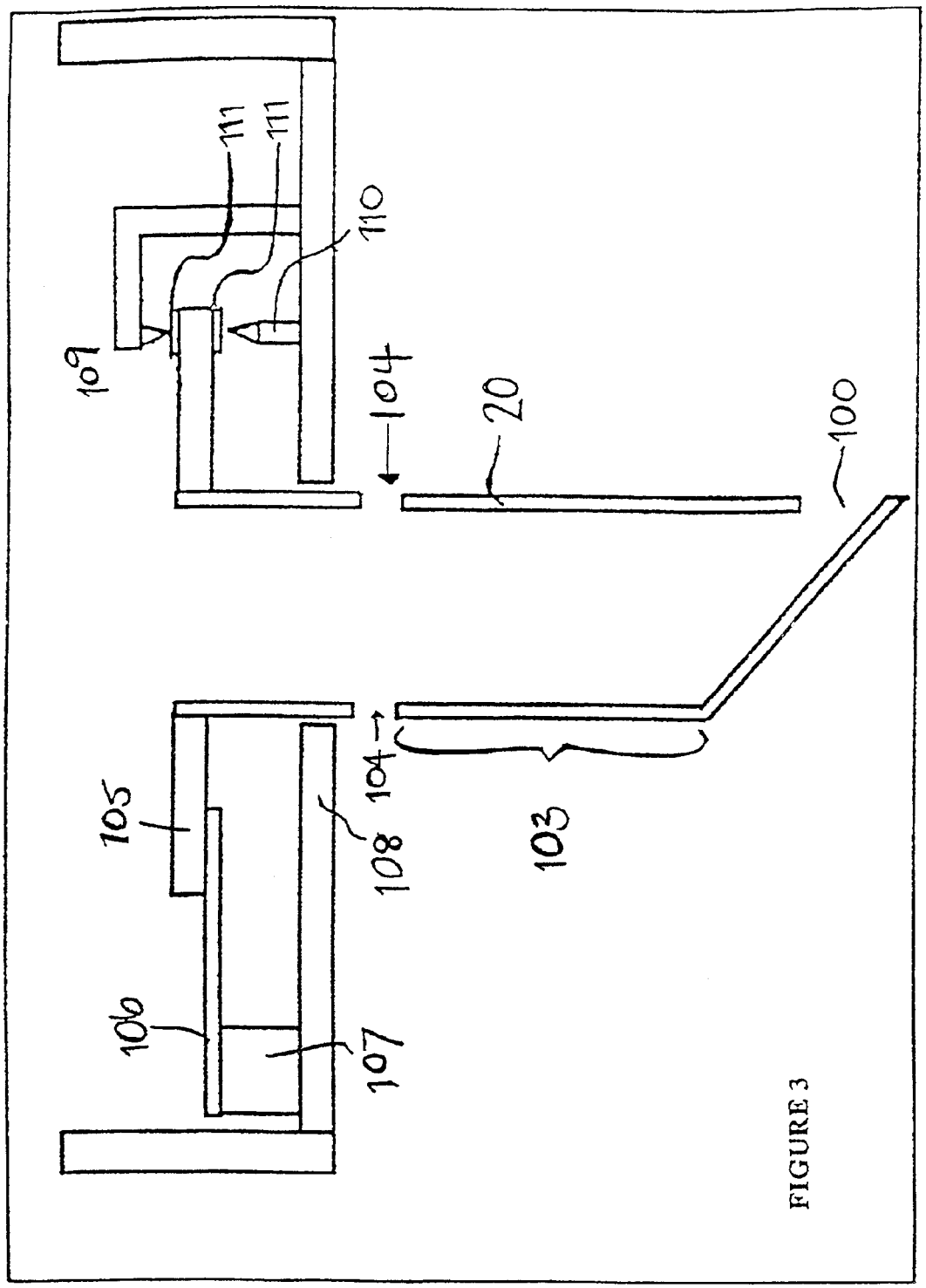
FIG. 3: is a cross-sectional schematic side of one preferred flow meter of the invention.
Figure 4:
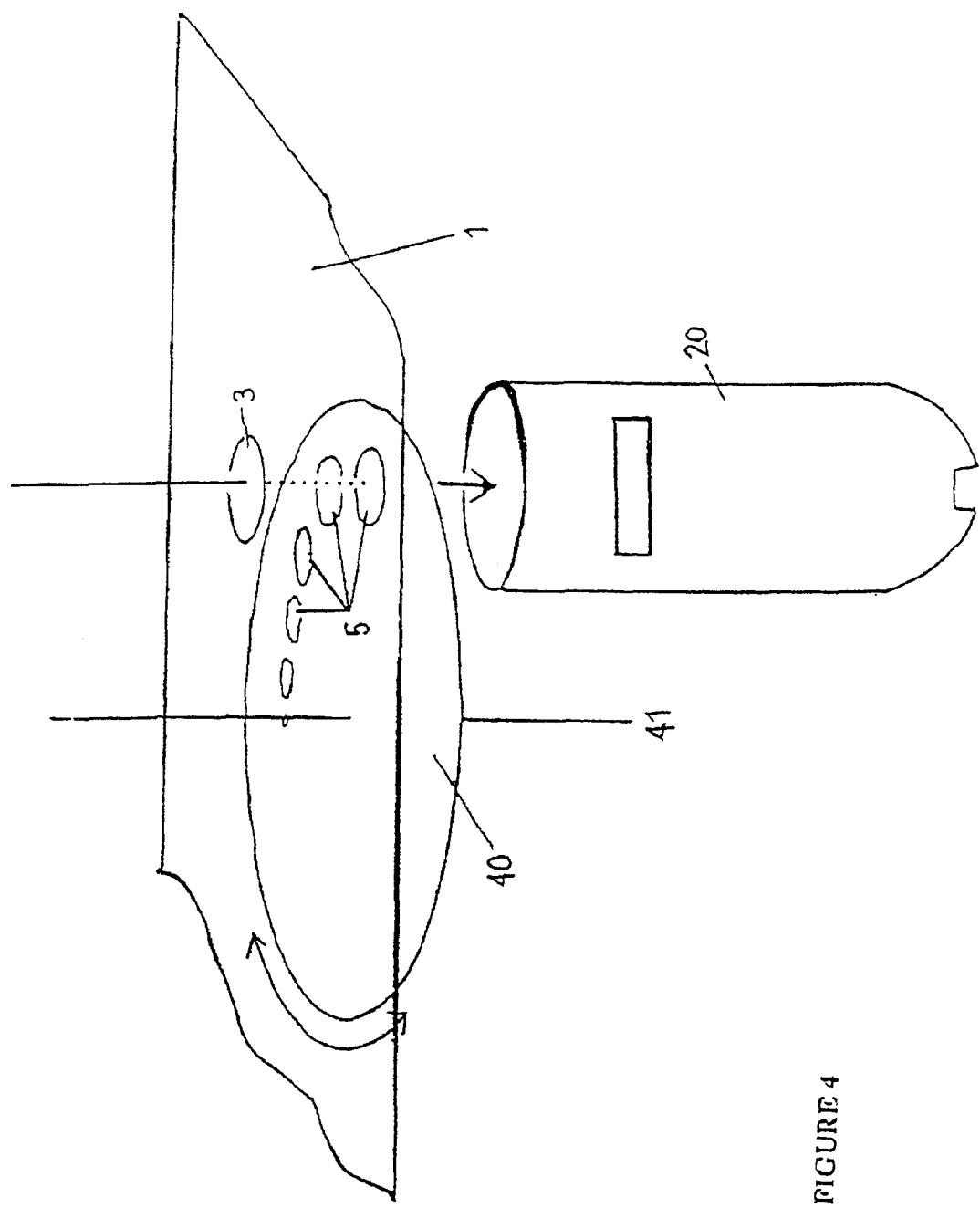
FIG. 4: is a schematic diagram of an example rotary type feed control system.

Referring to FIGS. 1, 2, 3, 4 and 8 reference number 1 indicates a hopper for holding a supply of material 2 which discharges from the hopper through bottom aperture 3. In FIGS. 2 and 4 only, a portion of the hopper is shown.

Material is discharged at pre-set rates from the feed hopper via a feed control means. By way of example and without intending to limit the scope of this invention, the feed control means may comprise either an adjustable discharge aperture, located above or below bottom aperture 3, or an appropriate mechanical discharge device incorporated into the base of the hopper, such as a pinch valve, belt, rotary or screw-type feeder.

The adjustable discharge aperture may incorporate by way of example any sliding, rotating or flow restricting mechanism for positioning several different sized apertures or altering the size, shape or effectiveness of a single aperture at the hopper's outlet.

Figure 5:
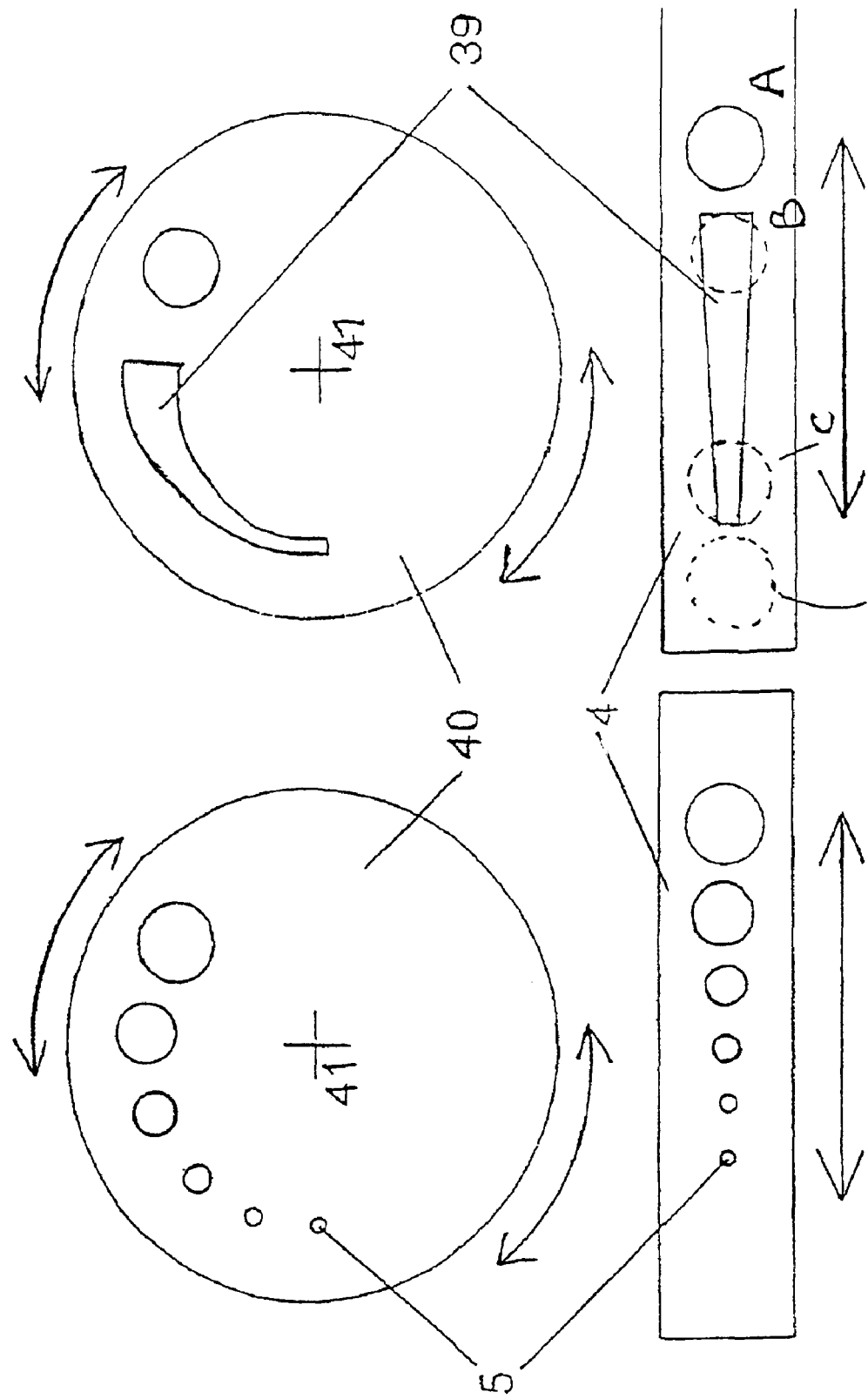
FIG. 5: is an example feed control slider and rotating disc aperture shapes.

The preferred feed control means incorporates a sliding control valve 4 with differently sized flow control apertures 5 spaced along its length: see FIGS. 4 and 5. The flow control apertures are located at known intervals along the sliding control valves length. Controlled movement by the positioning means allows discharge of material at discrete flow rates, depending on the aperture's flow characteristics for a given material. Use of a continuously variable opening 39, along the slider's length, as shown in FIG. 5, would result in a range of possible flow rates. The sliding control vale is positioned beneath the feed hopper in housing 13. This housing has a passage 14 that is aligned directly below the hopper's bottom aperture 3. Thus if one of the flow control apertures 5, see FIG. 2, is aligned between the bottom aperture and the housing passage, material will flow from the hopper.

By way of example and without intending to limit the scope of this invention, roller ball bearings 12 may be fixed at regular intervals along the housing's length to provide drag free movement of the sliding control valve in a horizontal plane beneath the hopper. These ball bearings may also be used to maintain the control valves position relative to the hoppers bottom apertures such that there is minimal clearance with the flow control holes, hence preventing leakage. In applications, for example where the metered material is non-abrasive and enhances free movement of the sliding valve it may be more advantageous to replace, if not omit, the ball bearing rollers for some alternative mechanism.

Figure 15:
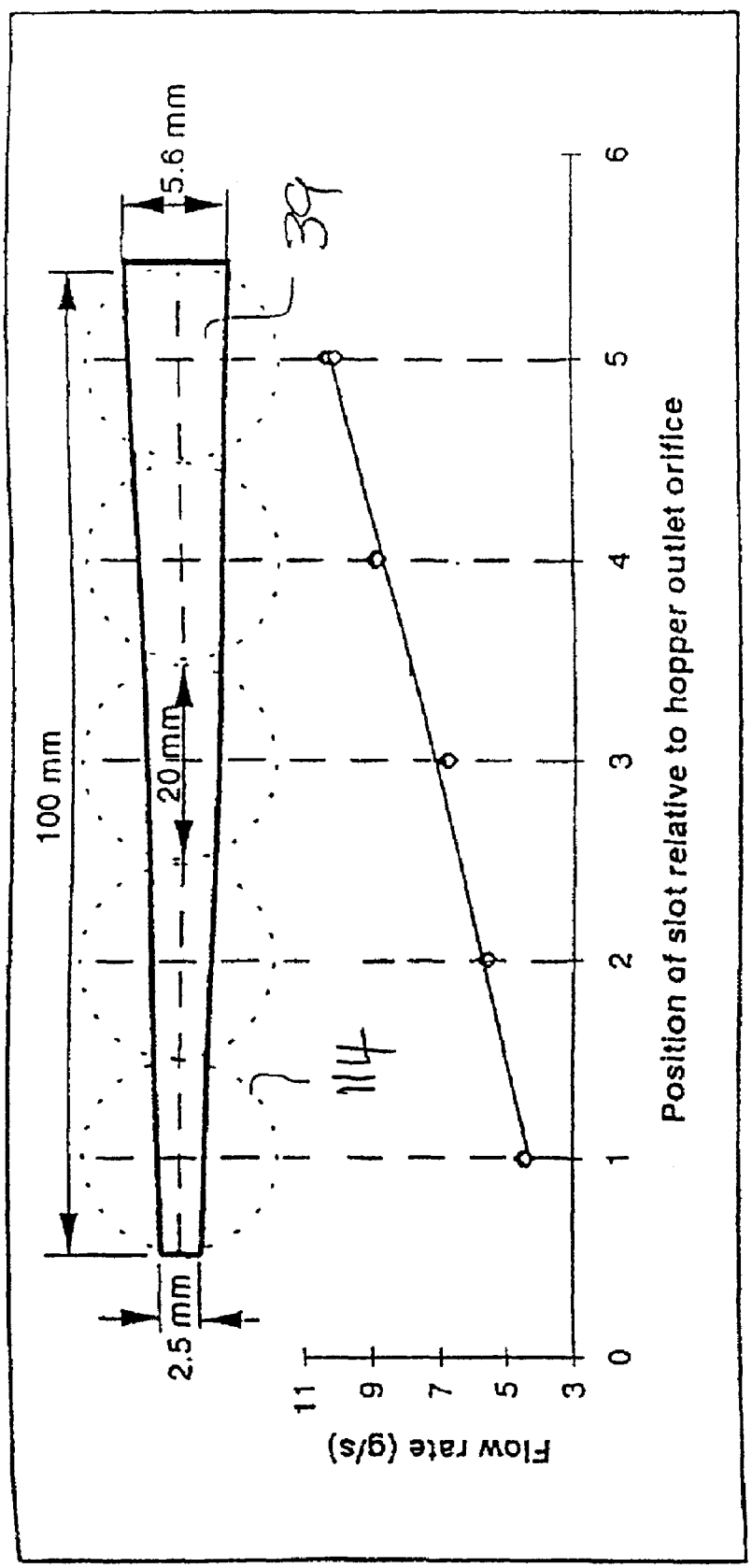
FIG. 15: is a graph of the setting of the preferred feed control slider illustrated in FIG. 5 against flow rate.

Six flow control apertures are shown in FIGS. 4 and 5. The number of apertures or type of opening configuration selected depends on the intended application. By way of example, six flow control apertures could be used when continuously supplying alumina to an electrolytic cell for production of aluminium by electrolysis of alumina to under-feed and over-feed alumina at rates above and below the standard or desired feed rate, in a ratio which gives the correct flow over time. The largest aperture is capable of discharging alumina at a nominal 500% of the average required feed rate. This aperture is required to discharge alumina in the event of an anode effect. Alternatively, use of a continuously variable opening 39 would provide the feeding system with a range of possible feed rates, with similar valve movements. As is illustrated in FIG. 15, the flow rate measured in an experiment is directly proportional to the position of the slot 29 relative to the upper outlet orifice 114 for this type of valve.

An example of a rotary disc feed control valve is detailed in FIG. 4. Rotational movement of the disc 40 about its central axis 41, in a parallel orientation with respect to the base of the hopper, enables apertures or variable openings to be aligned at the outlet point of the hopper, thus controlling the flow of material into the metering device. Use of a continuously variable opening 39 instead of a series of apertures spaced on the outer axis of the disc would result in a range of flow rates as opposed to discrete rates. Application of a rotary control valve is expected to be more favourable, being easier to maintain. A rotary control valve would also be favourable in situations where a compact unit is required due to space limitations.

If an abrasive feed stock, such as alumina, is to be in direct contact with key valve components it is preferable that these components be made of an appropriate wear-resistant material. Furthermore, it is preferable that these parts are easily replaceable.

Movement of any feed control orifice system is actuated by an appropriate positioning means. By way of example, the positioning means may incorporate any pneumatic or electric, rotary, linear or screw type actuators which may or may not have any feedback capability.

The preferred positioning means for the sliding valve feed control means comprises a computer controlled pneumatically or electrically driven linear actuator 6. A remote cable 8 may be used to place the actuator away from a hostile environment, as shown in FIG. 1. The actuator includes a linear resistive transducer (not shown) to determine the position of the sliding control valve. This system is able to position the control valve within 1 mm of its set point. The linear actuator may be linked via a remote cable 8 with couplings 7 to the slider control valve when operating in hazardous operating environments which may degrade the performance of the linear actuator or in situations where space is limited. The remote cable has a flexible internal core 9 that moves independently of the external sheath when clamped 10. Thus, the linear actuator does not need to be in the same plane as the sliding control valve.

The positioning means for the rotary valve assembly as shown in FIG. 4 would require either a rotary actuator attached to the central pivot point 41 of the disc or alternatively a linear actuator connected at the circumference of the disc.

With reference to FIG. 2, flowing particulate material that discharges through the feed control means can either be fed directly into the metering chamber 20 or passed through any suitable screening arrangement such as an inclined self cleaning screen 16. FIG. 4 demonstrates use of the slot flow meter with no pre-feed screen device.

Figure 6:
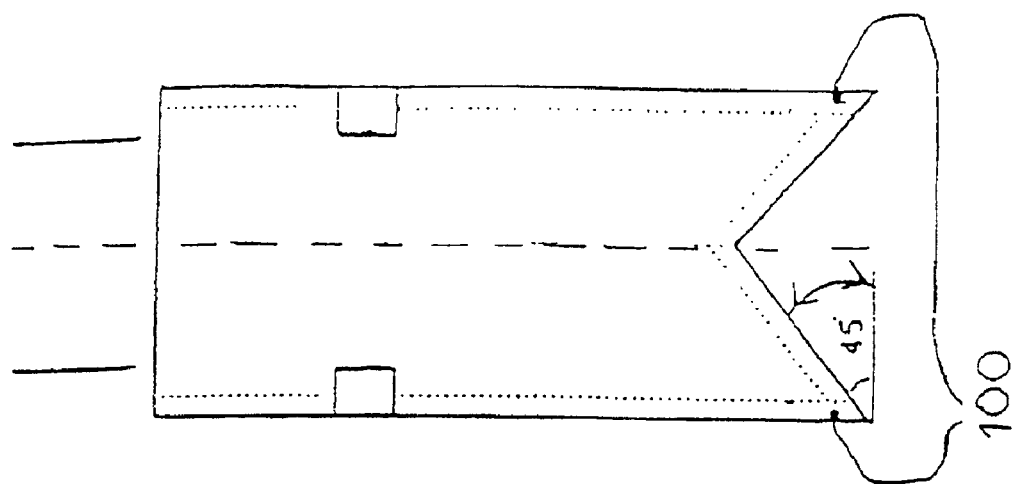
FIG. 6: shows two cross-sections of one preferred form the flow meter illustrated in FIG. 3.
Figure 6:
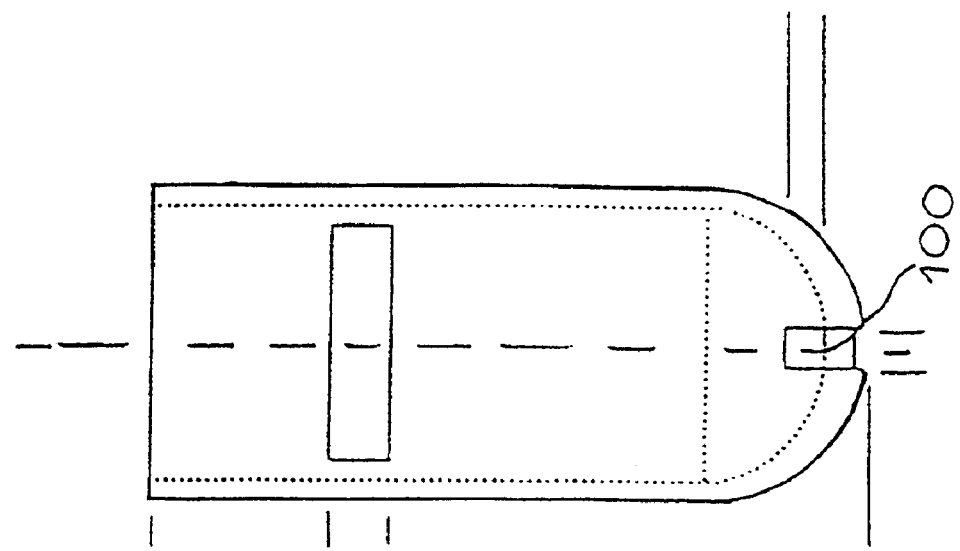
Figure 8:
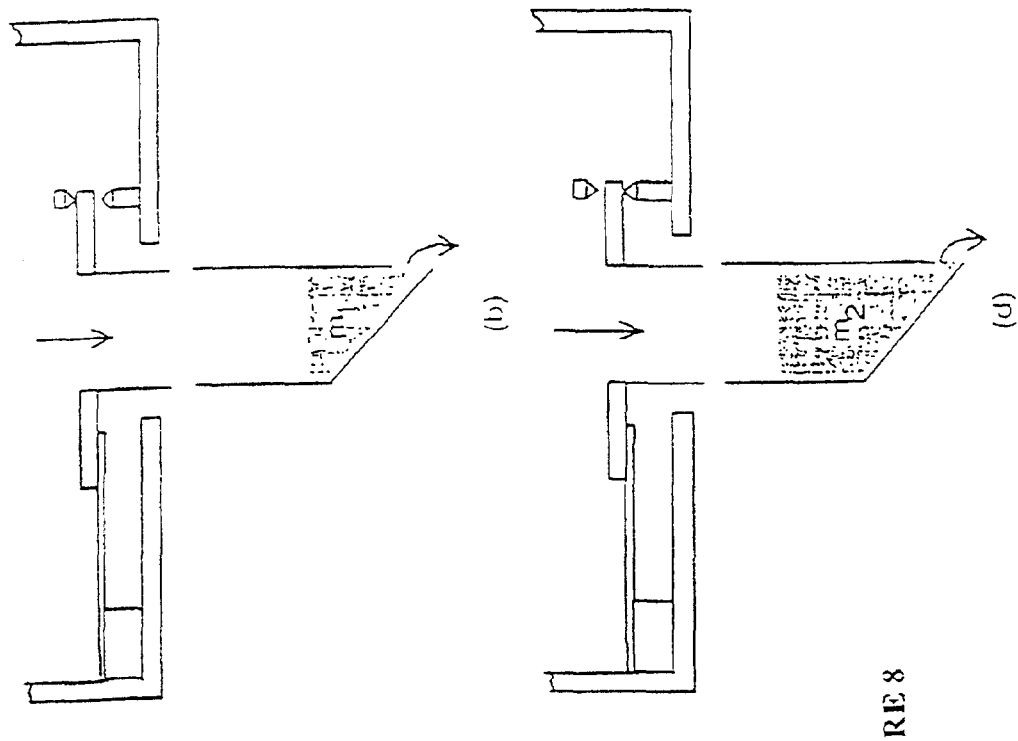
FIG. 8: illustrates the method for measuring an inlet flow rate according to a preferred embodiment of the invention.
Figure 8:
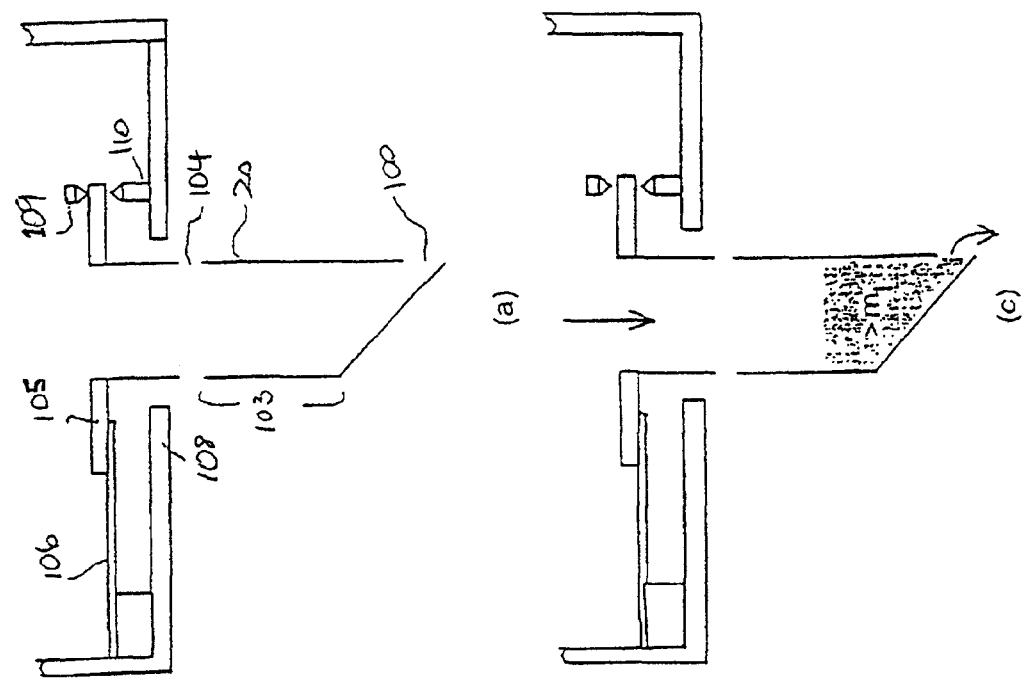

A preferred embodiment of the invention illustrated in FIGS. 3, 6 and 8, the outlet aperture 100 of the chamber 20 is sized to permit passage of oversized material. Indeed, it is a significant advantage of the present invention that the chamber enables oversized material to pass through without effecting the calibration of the feed system or the mass flow calculation.

The flow meter of one preferred embodiment of the present invention illustrated in FIGS. 3, 6 and 8 includes a chamber 20 through which flowable material (in particular alumina) can pass, the chamber 20 including an outlet aperture 100 at a lower end thereof, and a wall 102 defining an enclosed region (or a "closed slot" region) above the outlet aperture 100. The chamber also includes two outflow openings 104 above the enclosed region 23 of the chamber 20.

The chamber illustrated in FIGS. 3 and 8 includes one outlet opening. In an alternative embodiment illustrated in FIG. 6, the chamber 20 includes two outlet openings toward (or more specifically at) it's lower end. The base of the chamber illustrated if FIG. 6 is inclined at a 45 degree angle towards each of the two outlet openings 100. This configuration of the base of the chamber facilitates even distribution of flowable material to each of the outlet apertures.

Referring to FIG. 3, the measurement means of a preferred embodiment of the invention is illustrated. This system involves the use of measuring the mass of solids in the weighing chamber 20 at two discrete levels corresponding to the closed slot region of the flow meter.

The chamber 20 of the flow meter is positioned inside chamber housing 105 which is in turn coupled to a carbon fibre beam 106. The carbon fibre beam 106 is supported by an end support 107 which keeps the carbon fibre beam in a spaced apart relationship to the flow meter housing 108.

The spring beam arrangement illustrated in FIG. 3 is pre-loaded by a known mass $m_1$.

The mass measurement means also includes upper and lower contact terminals 109 and 110. A voltage is supplied across the terminals 109 and 110. The region of the chamber housing 105 that comes into contact with the terminals 109 and 110 is insulated by insulating plates 111. With reference to FIG. 8, the operation of this on/off contact arrangement is demonstrated for a chamber 20 being filled with solids.

The upper terminal is in electrical contact with the insulating plate 111 on top of the chamber housing 105 when the chamber is empty. This is due to the pre-loading of the spring beam arrangement as described above. Physical contact between terminal 109 and plate 111 is only broken when the mass of solids inside the chamber 20 exceeds $m_1$. Electrical contact between the lower terminal 110 and lower plate 111 occurs when the mass of solids inside the chamber 20 is greater than, or equal to, mass $m_2$. Accordingly by recording only the output state for each of the terminals 109 and 110 it is possible to determine the time at which electrical contact is made and lost. This information is all that is required to calibrate the flow meter.

One alternative to this system is to provide an optical sensor to measure the location of the chamber at one of two positions corresponding to the two masses of material ($m_1$ and $m_2$) in the chamber. Such an optical detector system may for example include a beam of light which is blocked by the chamber when the chamber lowers below a point (corresponding to $m_1$ being present in the chamber) and another beam of light which is blocked when the chamber lowers below a point corresponding to $m_2$. This arrangement has the advantage of avoiding corrosion contact between the contact terminals 109 and 110 and the plates 111.

Meter Calibration

For the flow meter of the preferred embodiment of the invention illustrated in FIGS. 3, 4 and 6, the following method is used for calibration using the two mass point determining mechanism described above.

Figure 9:
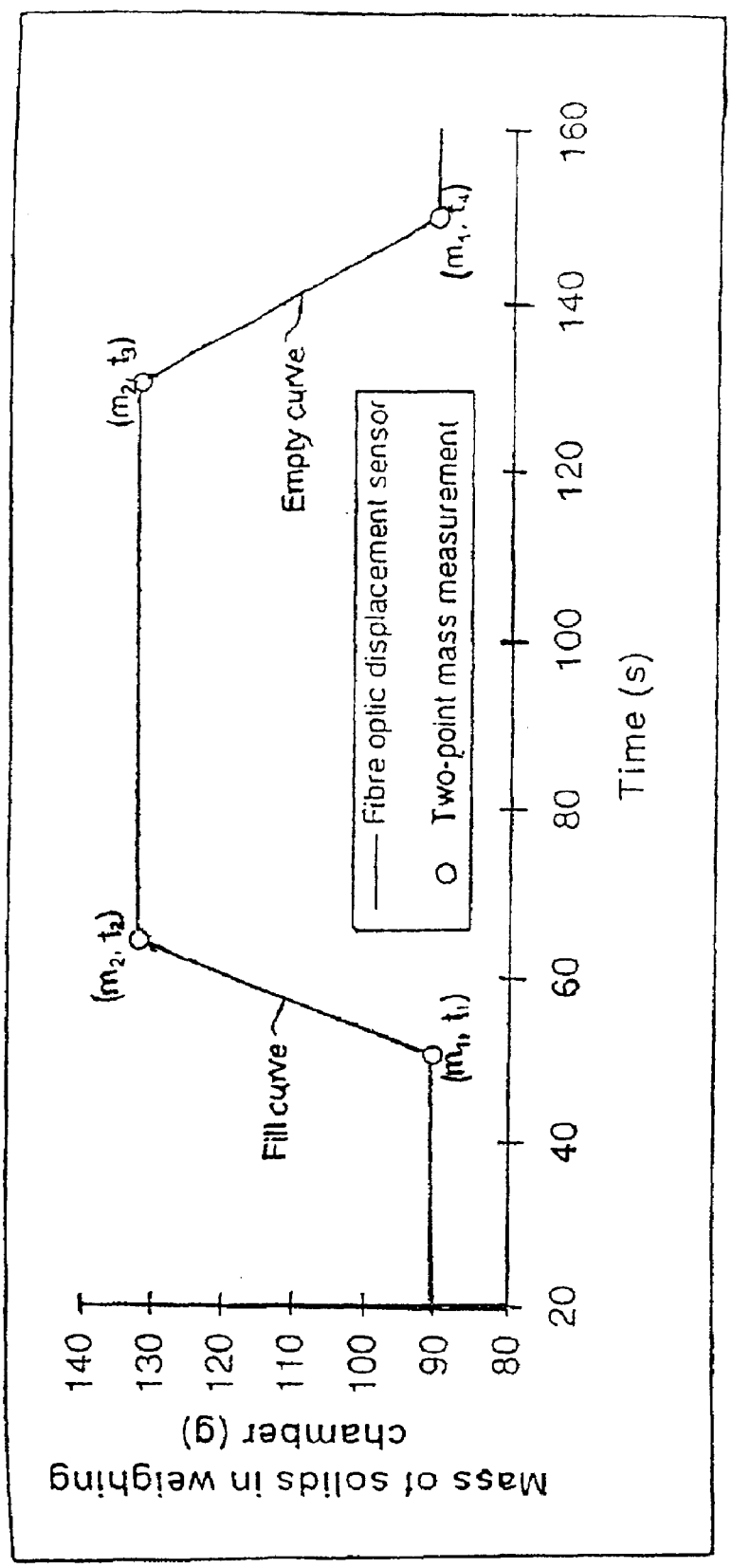
FIG. 9: illustrates closed slot calibration trial results using the flow meter illustrated in FIG. 6.

FIG. 9 illustrates the closed aperture calibration trial for an incoming alumina primary flow rate of 5.1 g/s. It is to be noted that the Figure illustrates the 4 points obtained using the calibration method of the present invention, as well as on-line mass data obtained by another technique for comparison purposes. The information generated illustrates the fact that the filling and emptying curves in the closed aperture region of the flow meter are almost linear and therefore can be approximated by a straight line between two points.

On-line mass data was only recorded between the limits of 90.5 g and 131.5 g because the spring movement of the chamber 20 was restricted by the upper and lower contact points of the mass measurement system. These contact point limits correspond to the closed aperture calibration masses $m_1$ and $m_2$, respectively.

The incoming flow rate of solids into the chamber 20 can be determined from the slope of the filling curve added to the absolute slope of the discharge curve between $m_1$ and $m_2$. Hence, by filling and emptying the chamber of solids from $m_1$ to $m_2$ and then $m_2$ to $m_1$ and measuring the time taken to pass between each mass level, it is possible to calculate the incoming flow rate of solids in a straightforward manner.

The filling and emptying flow rates were calculated using Equations 1 and 2, respectively, $$F_{fill} = (m_2 - m_1)/(t_2 - t_1) \quad \text{Equation 1.}$$

$$F_{empty} = (m_1 - m_2)/(t_4 - t_3) \quad \text{Equation. 2}$$

$F_{empty}$ is negative (slope of the graph is negative) and is always so since $m_2 > m_1$. Therefore, $$\text{absolute}(F_{empty}) = (m_2 - m_1)/(t_4 - t_3).$$

The incoming flow rate of alumina into the meter was calculated using Equation 3.

$$\begin{aligned} F_{inlet} &= F_{fill} - F_{empty} \quad &\text{Equation 3} \\ &= F_{fill} + \text{absolute}(F_{empty}) \\ &= (m_2 - m_1)\{[1/(t_2 - t_1)] + [1/(t_4 - t_3)]\} \end{aligned}$$

Figure 10:
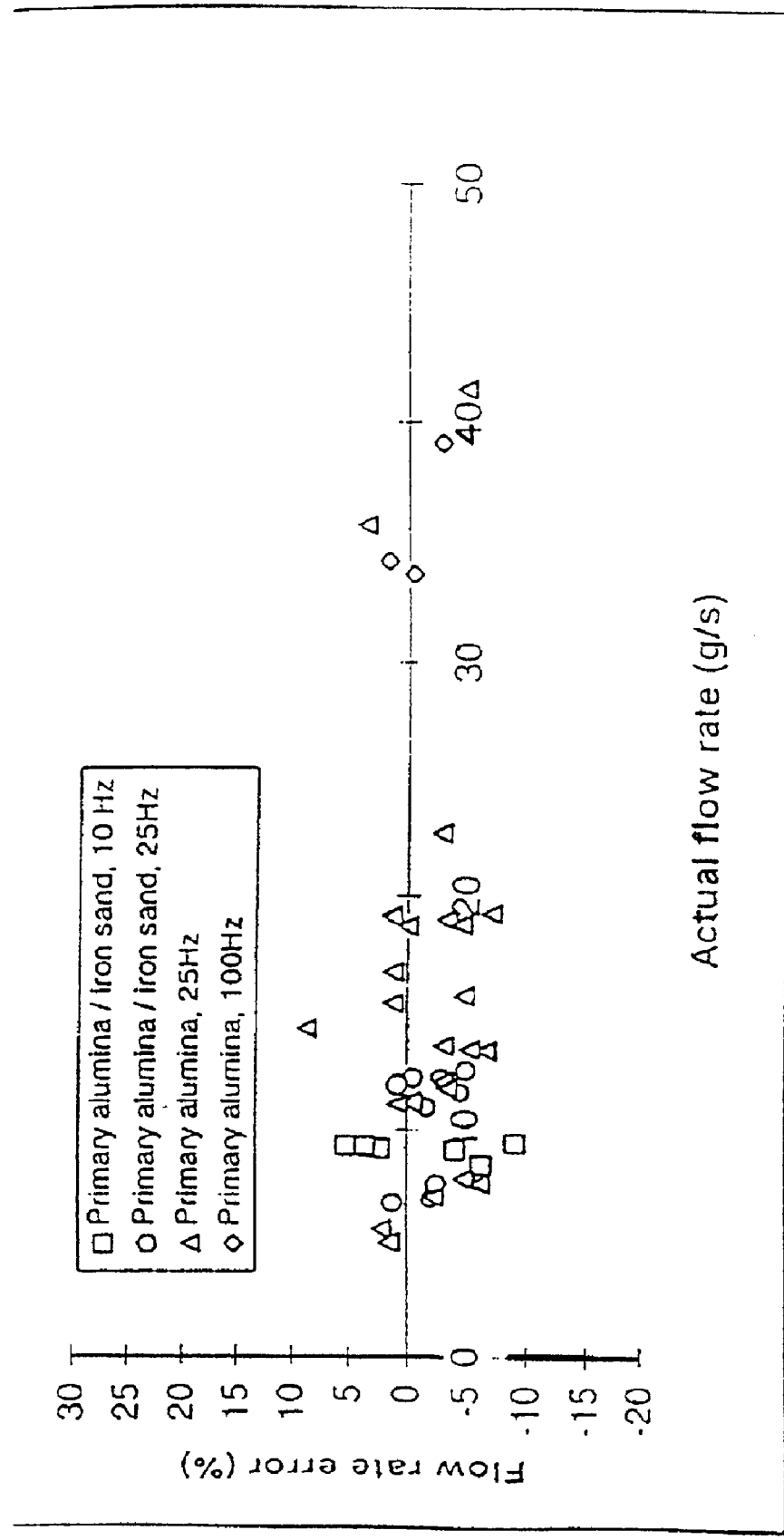
FIG. 10: illustrates the closed slot calibration trial accuracy results.

Using the closed aperture calibration approach in conjunction with the two-point mass measurement mechanism, the incoming flow rate of primary alumina and a 60/40 wt % mix of primary alumina/iron sand were estimated to within +/-6% of their actual values. These results, shown in FIG. 10, demonstrate that the flow metering system of the present invention is independent of:

material property factors,
and the incoming flow rate.

It can also be inferred that this system operates independently of meter blockages, because the closed slot calibration approach is based on the filling and emptying curves.

Consequently if blockage occurs, both the curves are affected equally and thus the net effect of the disturbances is cancelled.

Using the flow rate measurement technique set out above, the closed aperture type flow meter can be calibrated.

The sliding valve 4 having a continuously variable opening 39 illustrated in FIG. 5 was used in this technique.

The valve 4 was set to position B and the time taken for the mass to rise from $m_1$ to $m_2$ was measured. The valve was then set to position D (so that the flow of material into the chamber 20 was interrupted) and the time taken for the mass to lower from $m_2$ to $m_1$ was measured. The Flow rate for the valve at position B (corresponding to a maximum flow rate outside the anode effect flow rate) was calculated using Equation 3. The same procedure was repeated for the valve at position C (corresponding to a minimum flow rate outside the "off" position D). From these two measurements, a flow rate versus valve (flow control means) setting expression was calculated.

The closed aperture calibration method can also be used to calibrate a modified slot flow meter having a closed aperture region above the slot of a sufficient size for the closed slot calibration technique to be conducted before the slot is "opened".

Figure 12:
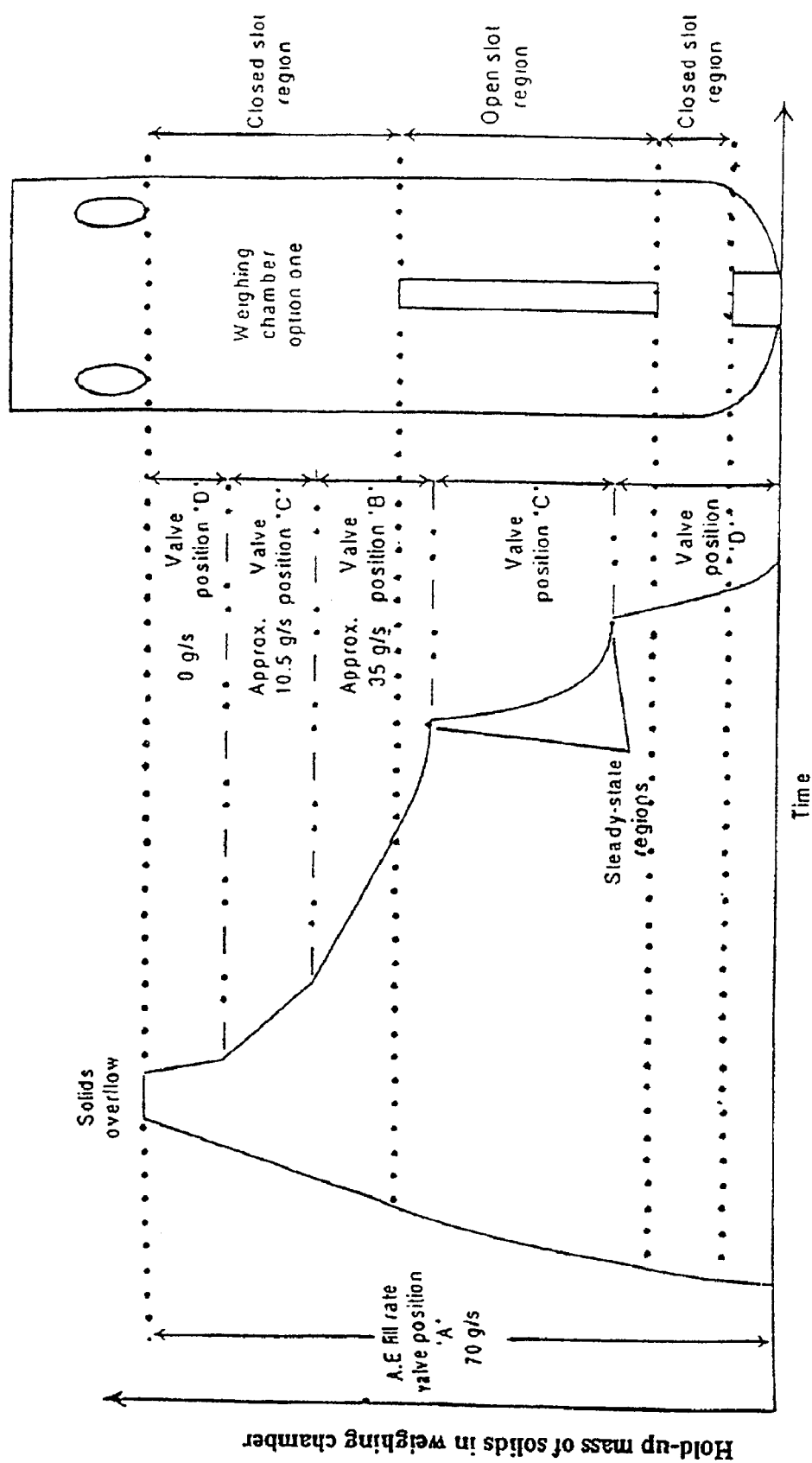
FIG. 12: is a schematic graph of the calibration sequence results obtained using the flow meter of FIG. 7.

FIG. 12 illustrates a chamber 20 which is suitable for use in this embodiment of the invention. The chamber includes two closed aperture regions 103. The upper region 103a is large enough for the closed aperture calibration method to be conducted before the level of material in the chamber falls below point 113.

Figure 14:
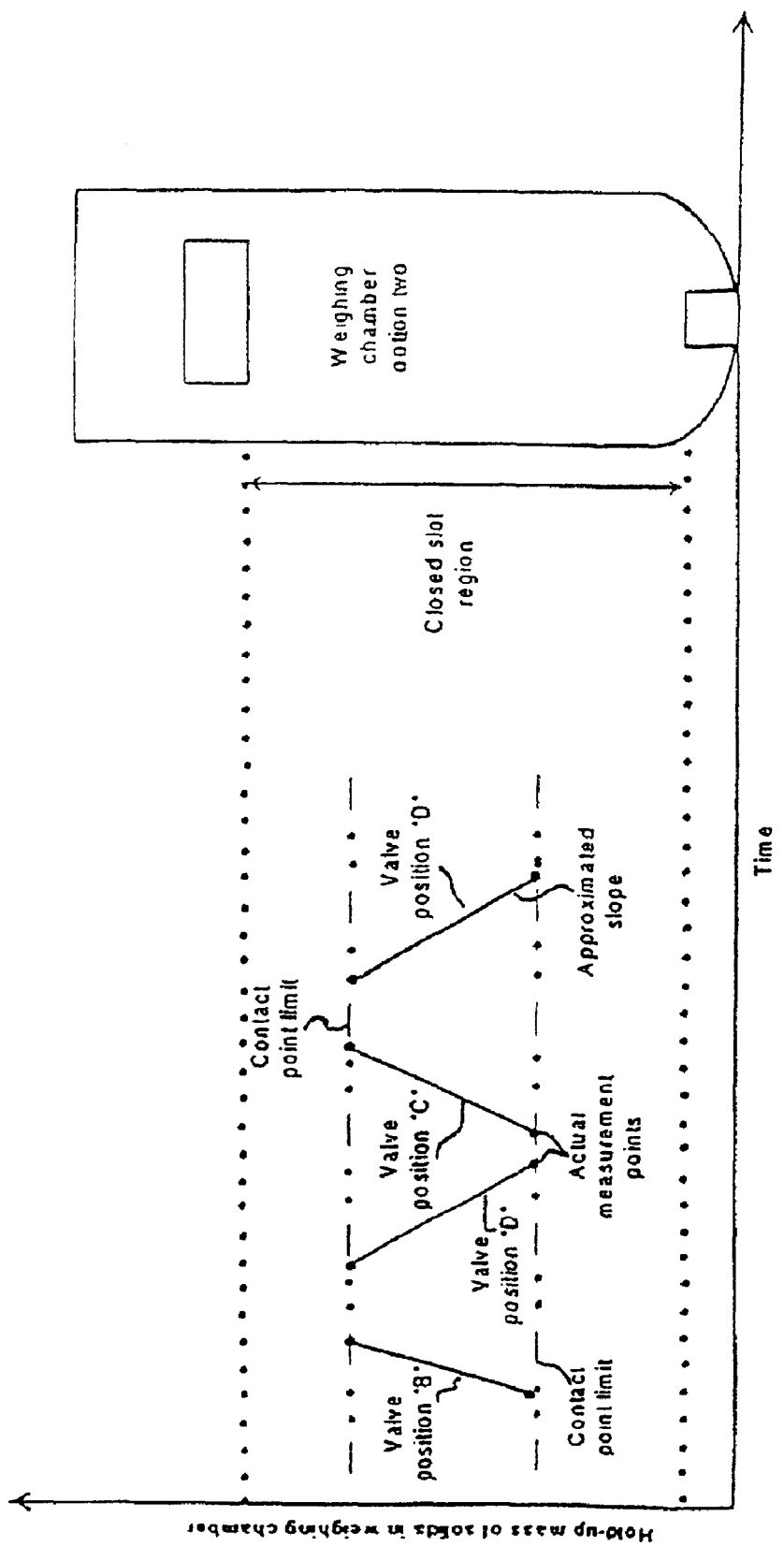
FIG. 14: is a schematic graph of the calibration sequence results obtained using the flow meter of FIG. 6.

In contrast to the embodiment illustrated in FIGS. 9 and 14, the mass of the chamber for this embodiment is not measured using the simple two-point mass determination means described in detail above. Instead, a more complex system of the type used in open slot flow rate determination methods is used. This mass determination means calculates the actual mass of the material in the chamber 20.

At the start of the calibration procedure, the chamber 20 is filled with the flowable material (by opening the sliding valve 4 to position A) to a level above the open slot region 102. On interruption or cessation of the flow of material into the chamber, the mass of the solids in the chamber decreases as the material drains from the slot and the outlet aperture 100. The time interval $(t_6 - t_5)$ for the mass of material flowing out to the chamber 20 to pass from an arbitrary mass $m_5$ to a second arbitrary mass $m_6$ is measured and the flow rate $F_{empty}$ (again, a negative figure since the second mass is less than the first) is calculated.

The valve is then set at valve position C and the time interval $t_6 - t_7$ for the mass of material to pass from another arbitrary mass $m_7$ to another arbitrary mass $m_8$ is measured, and the flow rate $F_{fill}$ is calculated. This value is also negative, as indicated by the slope of the graph.

The mass flow rate for the inlet of material at setting C is calculated by:

$$\begin{aligned} F_{inlet} &= F_{fill} - F_{empty} \text{(where } F_{fill} \text{ and } F_{empty} \text{ are negative)} \\ &= \text{absolute }(F_{empty}) - \text{absolute }(F_{fill}) \end{aligned}$$

The same procedure is repeated for valve position B (ie. the flow rate $F_{fill}$ at valve position B is determined and the flow rate $F_{inlet}$ at valve position B is calculated from this and the flow rate $F_{empty}$). From these two flow rates, a flow rate versus valve position setting calibration expression is calculated.

Monitoring a Continuous Feeding System

The two calibration techniques of the two alternative embodiments of the invention described above can be used to monitor and control a continuous or semi-continuous method for feeding flowable materials into, for example, an electrolytic reduction cell.

Figure 7:
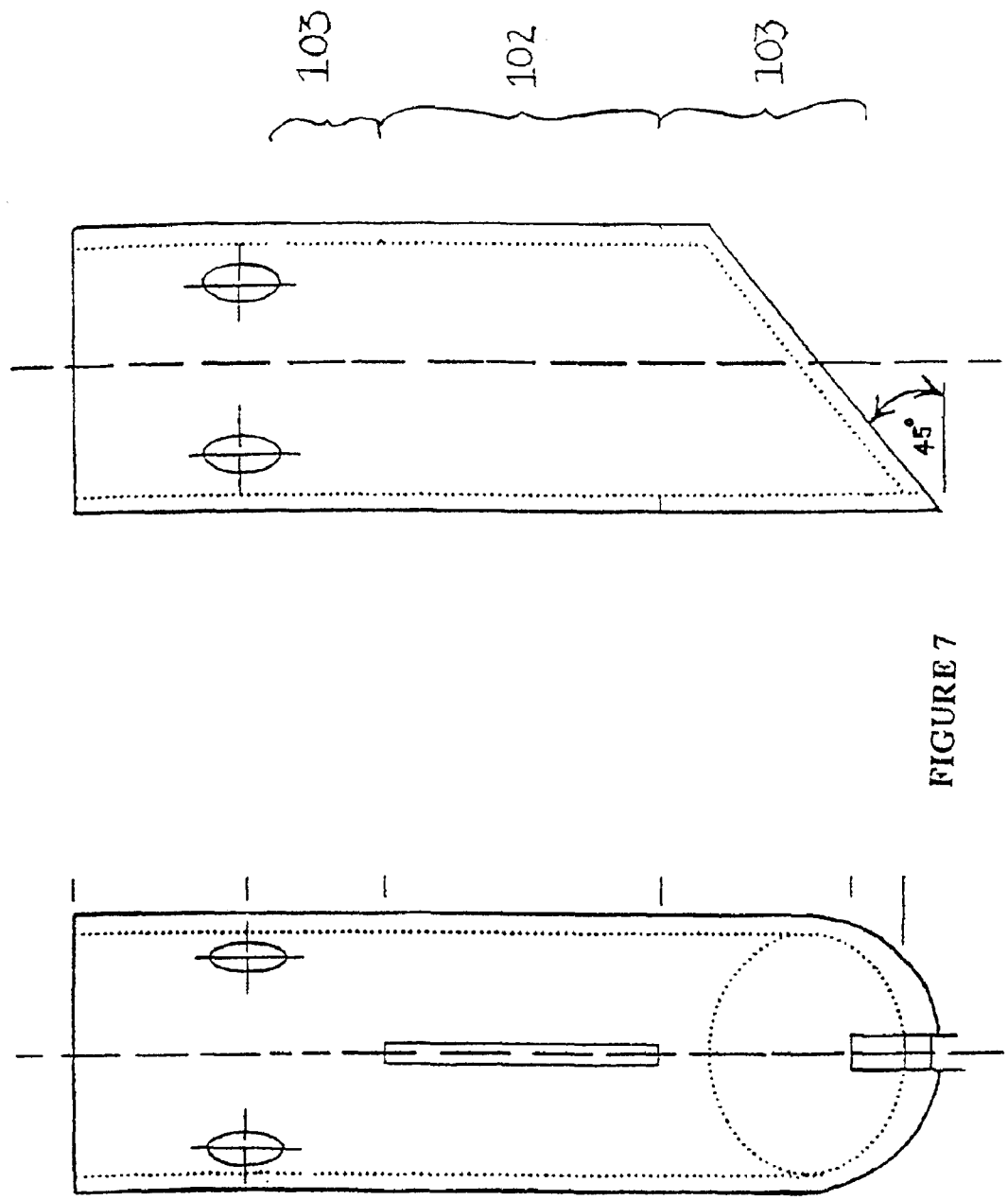
FIG. 7: shows two cross-sections of an alternative form of the flow meter of the present invention.
Figure 11:
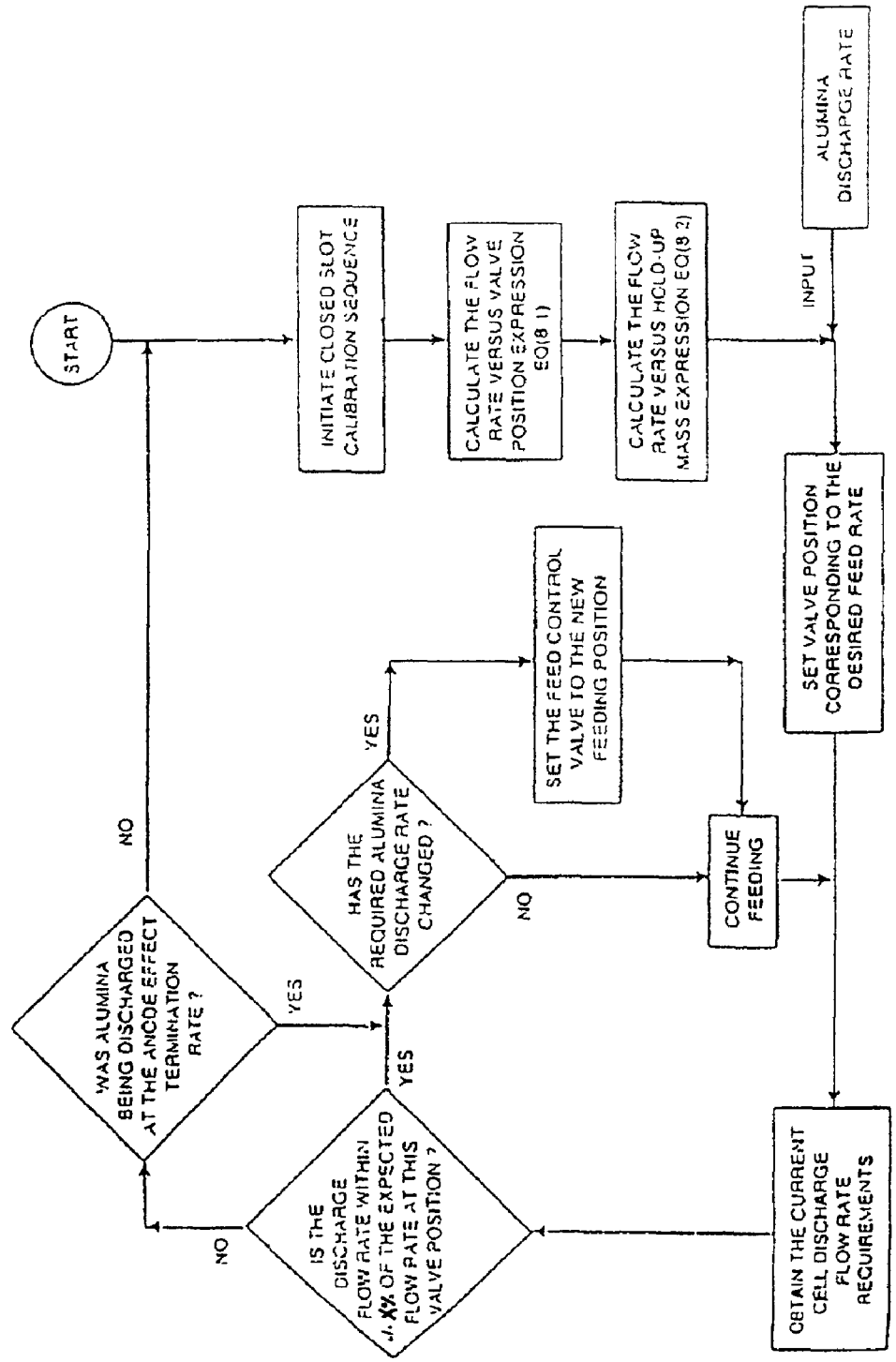
FIG. 11: is a block diagram of an example diagnostics algorithm for the method using the flow meter illustrated in FIG. 7.

Using the chamber of the embodiment illustrated in FIGS. 7 and 12, the control strategy set out in FIG. 11 can be used.

Figure 13:
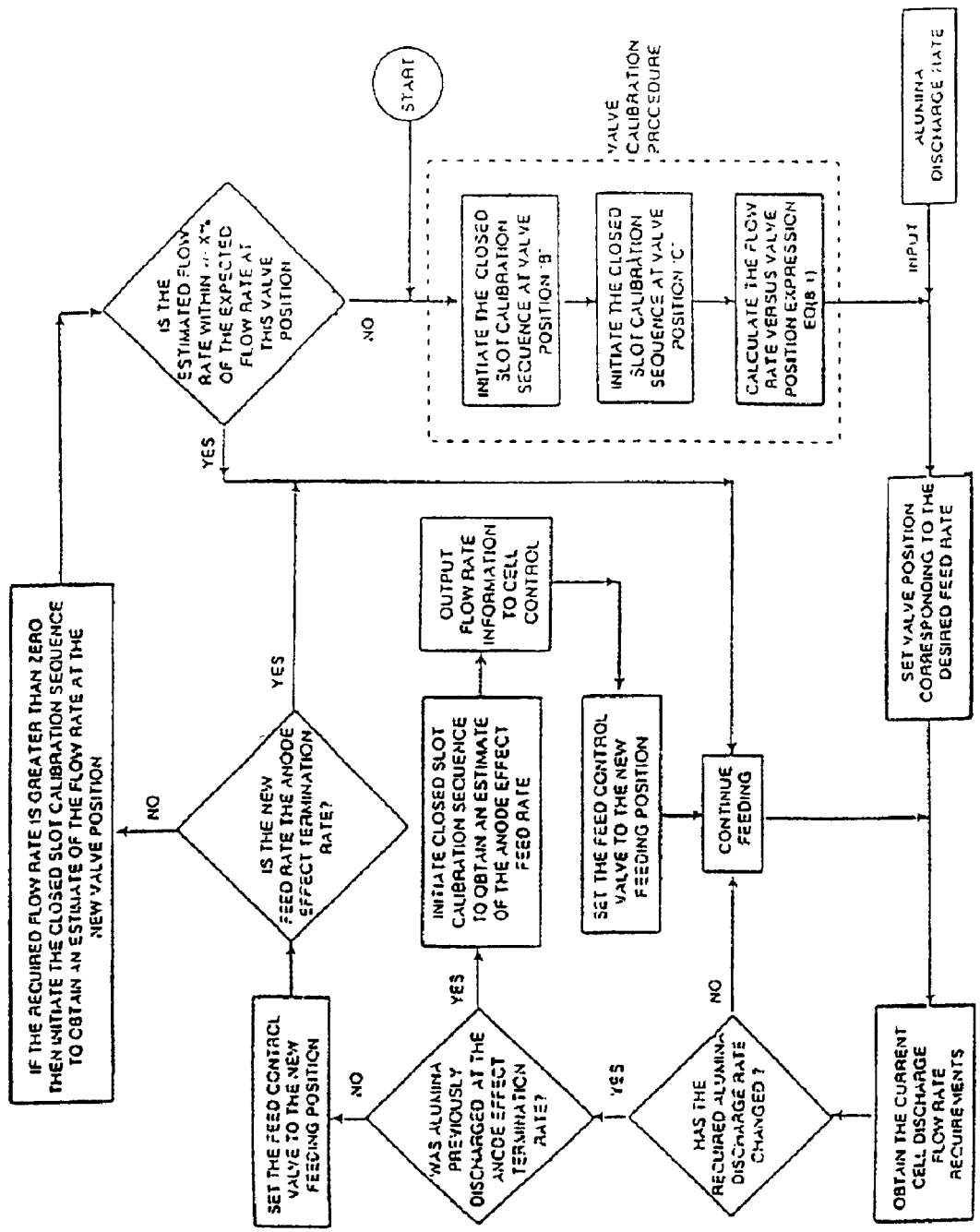
FIG. 13: is a block diagram of an example diagnostics algorithm for the method using the flow meter illustrated in FIG. 6.

Using the chamber of the embodiment illustrated in FIGS. 3, 6 and 7 the control strategy set out in FIG. 13 can be used.

It will be clear that the aluminium smelter application referred to is but one of many uses of a controllable source of solid particulate material. For example the invention could be applied to the preparation of wet concrete in a readymix concrete plant or at a large construction site, or it could be applied in the manufacture of fertilizer for farming, where different mixtures of superphosphate, lime, and the like are mixed according to individual needs. The liquid flow monitoring aspect could be applicable in the food industry where viscous solutions such as syrups are dispensed, but it could also dispense foodstuffs such as peas.

It will be understood that various alterations and modifications may be made to the methods and apparatus described above without departing from the scope of this invention.

What is claimed is:

1. A method of determining an inlet flow rate ($F_{inlet}$) of a flowable material including:
   (a) passing an inlet stream of flowable material through a chamber having an outlet aperture to one end thereof;
   (b) measuring a first rate of change of quantity of material in the chamber when the material is entering at said inlet flow rate;
   (c) measuring a second rate of change of quantity of material in the chamber when no material is entering the chamber; and
   (d) calculating the inlet flow rate $F_{inlet}$ from said first and second rates;
   wherein steps (b) and (c) are conducted whilst the whole of the outlet aperture in the chamber is occupied by the flowable material, and the flowable material is flowing through the outlet aperture.

2. The method as claimed in claim 1 wherein the outlet aperture has a cross-sectional area such that, in use, flowable material flows from said outlet aperture at a rate less than the minimum flow rate to be measured.

3. The method as claimed in claim 2 wherein the first rate of change is calculated by measuring the time interval for the mass of material to pass from a first mass $m_1$ to a second mass $m_2$, and the second rate of change is calculated by measuring the time interval for the mass of material to pass from a third mass $m_3$ to a fourth $m_4$.

4. The method as claimed in claim 3 wherein the fourth mass is equal to the first mass ($m_4=m_1$) and the third mass is equal to the second mass ($m_3=m_2$).

5. The method as claimed in claim 2 wherein step (b) is conducted prior to step (c).

6. The method as claimed in claim 2 wherein the outlet aperture is one of a plurality of outlet apertures and the sum of cross sectional areas of said outlet apertures is less than the minimum flow rate to be measured.

7. The method as claimed as claimed in claim 1 wherein the chamber includes an elongate slot.

8. The method as claimed in claim 7 wherein the dimensions of the elongate slot are such that the flow rate of flowable material can be calculated at a different time interval to the time interval of steps (b) and (c) by an open slot method.

9. The method as claimed in claim 7 wherein the outlet aperture is spaced apart from the elongate slot.

10. The method as claimed in claim 9 wherein the chamber is elongate in an upright orientation and the elongate slot is longitudinally spaced apart from the outlet aperture.

11. A flow meter for use in the method according to claim 1, including:
    a chamber through which the flowable material can pass, the chamber including an outlet aperture at a lower end thereof and a wall defining an enclosed region above said outlet aperture, wherein the dimensions of the wall are such that flow rates can be measured whilst the whole of the outlet aperture in the chamber is occupied by flowable material; and
    measurement means for measuring the time taken for the mass of flowable material in the meter to pass from a first mass to a second mass, the measurement means comprising;
        displacement means enabling the chamber to move between a first position when a first mass of flowable material is present in the chamber and a second position when a second mass of material is present in the chamber, and
        timing means by means of which the time taken for the chamber to move between said first and second positions is measured.

12. The flow meter as claimed in claim 11 wherein the chamber includes a base which is inclined towards the outlet aperture.

13. The flow meter as claimed in claim 11 wherein the outlet aperture is one of a plurality of outlet apertures, and the base of the chamber is shaped to facilitate even distribution to each outlet aperture.

14. The flow meter as claimed in claim 11 wherein the chamber further comprises outflow openings above the enclosed region of the chamber.

15. The flow meter as claimed in claim 11 wherein the chamber includes an elongate slot.

16. The flow meter as claimed in claim 15 wherein the outlet aperture is constituted by the elongate slot.

17. The flow meter as claimed in claim 15 wherein the outlet aperture is spaced apart from the elongate slot.

18. The flow meter as claimed in claim 17 wherein the outlet aperture is at a lower end of the chamber and the elongate slot is spaced vertically above the outlet aperture.

19. The flow meter as claimed in claim 11 wherein the outlet aperture is one of a plurality of outlet apertures.

20. A flow meter for calculating the flow rate of a flowable material including:
    a chamber through which the flowable material can pass, the chamber having an outlet aperture at a lower end thereof of a cross section that enables flowable material to drain from the chamber at a rate less than the minimum flow rate to be measured; and
    measurement means for measuring the time taken for the mass of flowable material in the meter to pass from a first mass to a second mass, the measurement means comprising:
        displacement means enabling the chamber to move between a first position when a first mass of flowable material is present in the chamber and a second position when a second mass of material is present in the chamber, and
        timing means by means of which the time taken for the chamber to move between said first and second positions is measured.

21. The flow as claimed in claim 20 wherein the measurement means detects movement between two discrete positions corresponding to the first mass and the second mass only.

22. A method for calibrating the rate at which flowable material is discharged from a storage vessel through a flow control means, said flow control means having a plurality of settings controlling the rate of flow of flowable material discharged from the storage vessel over a flow rate range, the method including:
   (a) calculating the flow rate for a first flow rate setting of the flow control means;
   (b) calculating the flow rate for a second flow rate setting of the flow control means; and
   (c) calculating a flow rate versus flow control means setting expression;
   wherein the flow rates for the flow rate setting and the second flow rate setting are measured by a method of determining an inlet flow rate ($F_{inlet}$) of a flowable material including;
   (i) passing an inlet stream of flowable material through a chamber having an outlet aperture to one end thereof;
   (ii) measuring a first rate of change of quantity of material in the chamber when the material is entering at said inlet flow rate;
   (iii) measuring a second rate of change of quantity of material in the chamber when no material is entering the chamber; and
   (iv) calculating the inlet flow rate ($F_{inlet}$) from said first and second rates;
   wherein steps (ii) and (iii) are conducted whilst the whole of the outlet aperture in the chamber is occupied by the flowable material, and the flowable material is flowing through the outlet aperture.

23. The method as claimed in claim 22 wherein the first and second flow rate settings are the settings for flow rates toward the maximum and minimum ends of the flow rate range.

24. The method as claimed in claim 22 wherein the flow rates at the first and second flow rate settings are calculated using the flow meter for calculating the flow rate of a flowable material including: a chamber through which the flowable material can pass, the chamber having an outlet aperture at a lower end thereof of a cross section that enables flowable material to drain from the chamber at a rate less than the minimum flow rate to be measured.

25. A method of monitoring a continuous feeding system for flowable materials which flow through a flow control means having a plurality of settings, said method comprising:
   calibrating the rate at which flowable material is discharged to the flow control means to obtain a flow rate versus flow control means setting expression;
   setting the flow control means at the setting required to obtain a required flow rate as calculated by the flow rate versus flow control means setting expression; and
   re-calibrating the rate at which flowable material is discharged through the flow control means to obtain re-calibrated flow rate versus flow control means setting expression;
   wherein calibration comprises:
   (i) calculating the flow rate for a first flow rate setting of the flow control means;
   (ii) calculating the flow rate for a second flow rate setting of the flow control means; and
   (iii) calculating a flow rate versus flow control means setting expression;
   wherein each of the first and second flow rates are inlet flow rates, and each of the inlet flow rates ($F_{inlet}$) is determined by:
   (a) passing an inlet stream of flowable material through a chamber having an outlet aperture to one end thereof;
   (b) measuring a first rate of change of quantity of material in the chamber when the material is entering at said inlet flow rate;
   (c) measuring a second rate of change of quantity of material in the chamber when no material is entering the chamber; and
   (d) calculating the inlet flow rate $F_{inlet}$ from said first and second rates; and
   wherein steps (b) and (c) are conducted whilst the whole of the outlet aperture in the chamber is occupied by the flowable material, and the flowable material is flowing through the outlet aperture.

26. The method as claimed in claim 25 wherein the re-calibration step is conducted when a precondition is met.

27. The method as claimed in claim 26 wherein the precondition is one of the following:
   (i) that the feed rate required has changed and the previous flow rate was the maximum flow rate; and
   (ii) that the flow rate required has changed, the new flow rate required is not the maximum flow rate, the setting of the flow control means is changed to correspond to the new flow rate required, the flow rate at the new flow control means setting is calculated, and the new flow rate calculated is not within a tolerance range of the flow rate expected at the new flow control means setting.

28. The method as claimed in claim 26 wherein the precondition is:
   (i) that the discharge flow rate at a given flow control means setting measured by a second flow rate determining method is not within a tolerance range of the flow rate expected at the given flow control means setting.

* * * * *